United States Patent
Tyreman

(10) Patent No.: US 6,490,845 B1
(45) Date of Patent: Dec. 10, 2002

(54) PACKAGING AND PACKAGING MACHINES THEREFOR

(75) Inventor: Grahame Tyreman, Huddersfield (GB)

(73) Assignee: Coca-Cola Enterprises Limited, Middlesex (GB)

( * ) Notice: Subject to any disclaimer, the term of this patent is extended or adjusted under 35 U.S.C. 154(b) by 0 days.

(21) Appl. No.: 09/402,762

(22) PCT Filed: Apr. 1, 1998

(86) PCT No.: PCT/GB98/00965

§ 371 (c)(1),
(2), (4) Date: Dec. 29, 1999

(87) PCT Pub. No.: WO98/45186

PCT Pub. Date: Oct. 15, 1998

(30) Foreign Application Priority Data

Apr. 8, 1997 (GB) ............................................. 9707095

(51) Int. Cl.[7] ............................................. B65B 35/30
(52) U.S. Cl. ............................................ 53/448; 53/496
(58) Field of Search ..................................... 53/496, 448

(56) References Cited

U.S. PATENT DOCUMENTS

| | | | |
|---|---|---|---|
| 2,833,091 A | | 5/1958 | Whitney |
| 3,300,945 A | * | 1/1967 | Grossi et al. .................. 53/448 |
| 3,530,639 A | | 9/1970 | Bross |
| 3,722,087 A | | 3/1973 | Berg |
| 4,041,674 A | * | 8/1977 | Reid ............................. 53/496 |
| 4,204,610 A | | 5/1980 | Schlaepfer |
| 4,214,419 A | | 7/1980 | Allen et al. .................... 53/543 |
| 4,265,072 A | | 5/1981 | Egli |
| 4,693,057 A | | 9/1987 | Rittinger et al. |
| 5,737,902 A | | 4/1998 | Aylward |
| 5,765,342 A | | 6/1998 | Jensen et al. |

FOREIGN PATENT DOCUMENTS

| | | |
|---|---|---|
| EP | 299139 | 1/1989 |
| EP | 696542 | 2/1996 |
| NL | 285055 | 1/1965 |

* cited by examiner

Primary Examiner—Scott A. Smith
Assistant Examiner—Chukwurah Nathaniel
(74) Attorney, Agent, or Firm—Christie, Parker & Hale, LLP

(57) ABSTRACT

The invention relates to a trayless close packed array of cans locked together in a heat shrunk sleeve. The packaging machine includes a marshalling station for marshalling the cans in arrays in which there are unequal numbers of cans in each row and a collation station in which the array of cans in rows and columns are collated into close packed formation. A wrapping machine wraps a plastic sleeve around the close packed array and a sealing station seals and heat shrinks the sleeve around the array to lock the array into its formation.

10 Claims, 7 Drawing Sheets

PACKAGING AND PACKAGING MACHINES THEREFOR

The present invention relates to packaging and packaging machines therefor.

Cylindrical objects such as drinks cans and bottles are frequently packed in packs of twenty four. They are assembled in an array of four columns and six columns on a cardboard tray and the whole is wrapped in a polythene sleeve which is heated to cause the sleeve to shrink around the pack and lock the objects in their positions on the tray. The packs are then stacked on a pallet and transported to a warehouse for distribution.

A packaging machine for effecting the continuous packaging of the objects includes an elongate conveyor system onto which the objects are fed en masse at the upstream end. The conveyor passes between guides which constrain the objects to proceed only six abreast. The conveyor passes through a marshalling station which marshals the objects into spaced groups with each group arrayed in six rows and four columns. Each group is then fed through a tray assembly station in which a cardboard tray blank is fed under the array. Adhesive material is applied to various flaps of the blank and the blank is then erected using predefined fold lines to form a shallow tray. The array of objects on the tray continue along the conveyor for a period sufficient to allow the adhesive to take effect and then passed through a wrapping station. At the wrapping station, the leading end of a sheet of plastics is fed under the tray and a set of bars carry the trailing edge of the sheet forward over the top of the pack and in front of it so that the advancing pack passes over the trailing end and the sheet becomes completely looped about the pack in the form of a sleeve with the trailing and leading end portions of the sheet overlapping.

The sleeved pack then passes through a heating station. At the heating station the overlapping end portions of the sheet pass over heated rollers which seal the two portions together. Air jets are directed at opposite open ends of the sleeve to inflate the sleeve and simultaneously heat is applied to cause the sleeve to shrink relatively uniformly about the tray and the array of objects so as to lock the array of objects in position on the tray.

The pack of objects are then transported to a stacking station where the packs of objects are stacked on a pallet for subsequent transportation.

It is an object of the invention to provide an improved packaging and packaging machine.

According to the invention there is provided a trayless close-packed planar array of filled cans or bottles enveloped in a sleeve of heat shrinkable plastics shrink-wrapped around the cans or bottles and covering the cylindrical ends of all the cans or bottles, the cans or bottles being arranged in an odd number of rows, with each alternate row having the same even number of cans or bottles and each intervening row having the same odd number of can or bottles, the sleeve being of sufficient thickness to hold the cans or bottles generally in their close-packed formation when carried unsupported.

According to the invention there is further provided a marshalling station for marshalling cylindrical objects arriving at the station into spaced arrays having different numbers of objects in different rows, the station comprising a reservoir for temporarily storing said objects as they arrive, a plurality of parallel conveyor belts, each belt being arranged to receive one row of said objects from said reservoir, a pair of arresting means located on opposite sides of each belt to be engaged by the leading object of each row, each arresting means being movable in the same direction as the belts but at a slower speed than the belts, different arresting means associated with different belts moving at different speeds so that during the period that said arresting means are operational, the objects on different belts move at different speeds, whereby when the arresting means disengage said objects, the plurality of belts will accelerate away from said marshalling station, an array of objects in which different rows contain different numbers of objects.

According to the invention there is still further provided a collating station for collating an array of twenty five objects arranged in a first formation into a second formation, comprising first conveying means for conveying the objects, row wise, in the first formation in which the objects are arranged in seven rows, the middle three rows having three objects each and the remaining rows having four objects each, pusher means for engaging the trailing column of objects of the array to displace the array in the same direction as being moved by the first conveyor means across a stationary surface and onto second conveyor means and then disengaging the array, the pusher means having projections which provide additional displacement of alternate rows of the array by an amount not exceeding the radius of the object, and guide means having converging surfaces to compress the array as it is being driven across the stationary surface into a close packed array in which each alternate row has four objects and each intervening row has three objects and thereby define said second formation.

Packaging and packaging machines embodying the invention, will now be described, by way of example, with reference to the accompanying diagrammatic drawings, in which.

Figure 1:
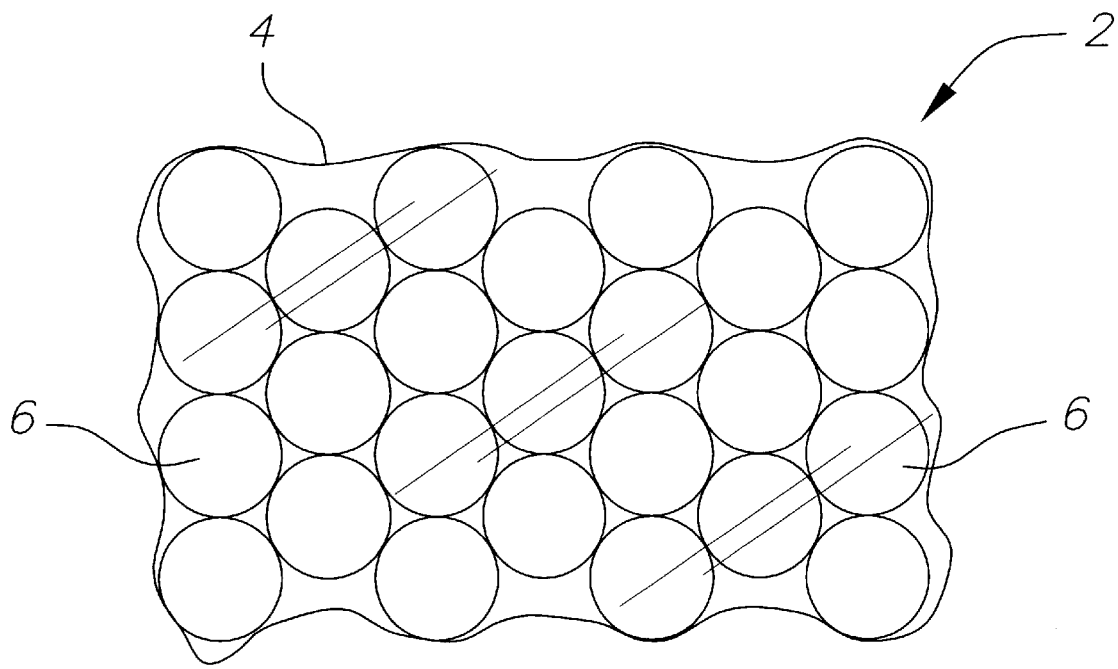
FIG. 1 is a plan view of a pack of beverage cans in a shrink-wrap package.
Figure 2:
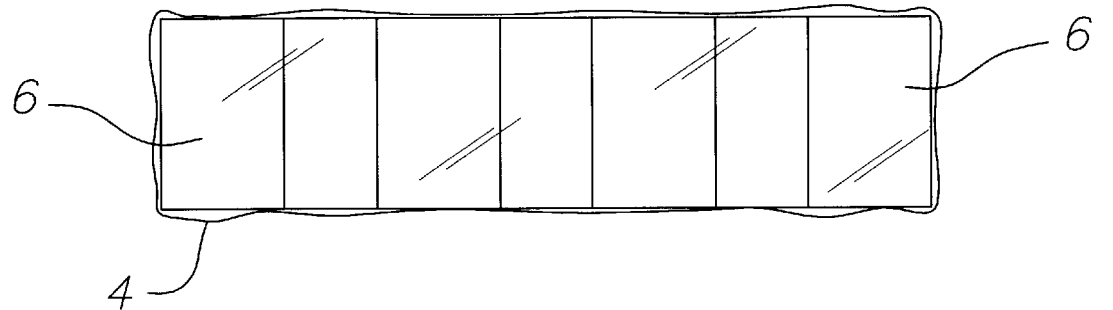
FIG. 2 is a front elevation of the pack of FIG. 1.

FIGS. 1 and 2 show a trayless pack 2 of beverage cans arrayed in close packed configuration held together by a shrink-wrap sleeve 4.

The array consists of twenty five in number instead of the usual twenty four. Also, as shown in FIG. 1, each alternate row of cans contains four cans while each intervening row contains only three cans.

It will be seen that the smallest rectangle within which the array can lie has an area only about 2% greater than the smallest rectangle within which a regular array of twenty four similar cans but arranged in three columns and six rows can lie. At the same time, however, the number of cans has been increased by about four percent. It will thus be seen that using the close packed twenty five can packs, more cans can be stored per unit volume. In a factory where hundreds of thousands of cans might be filled, packed and shipped on a daily basis there would be significant savings in warehousing and transportation costs. Also, because the pack of the present invention is trayless, there are further savings in the weight and volume occupied by the tray.

A further benefit of the close packed arrangement arises because most of the cans (except the four cans at the four corners of the pack) have more lines of contact with other cans than in the prior art twenty four pack array of regular rows and columns. In the prior art pack, the most lines of contact that any can will have with other cans is four, while in the array of the present invention the figure is six. More lines of contact means that any load applied to the pack is distributed more widely and, in the event, for example of impact by falling on the floor, less damage to the cans is likely to occur.

A further advantage of the close packed array is that relative movement between the cans inside the sleeve is well constrained. In the prior art regular twenty four pack array additional constraint is provided by the tray on which the cans rest.

While the description of FIGS. 1 and 2 is limited to a twenty five pack close packed array, it will be appreciated that smaller arrays of trayless closed packed packs can also be processed. The packs can be as small as six (arranged in three columns of two cans, three cans and two cans) or seven (arranged in three columns of three cans, two cans and three cans).

Also, it will be appreciated that instead of cans, other cylindrical objects, such as bottles, can be packed in a similar manner.

Figure 3:
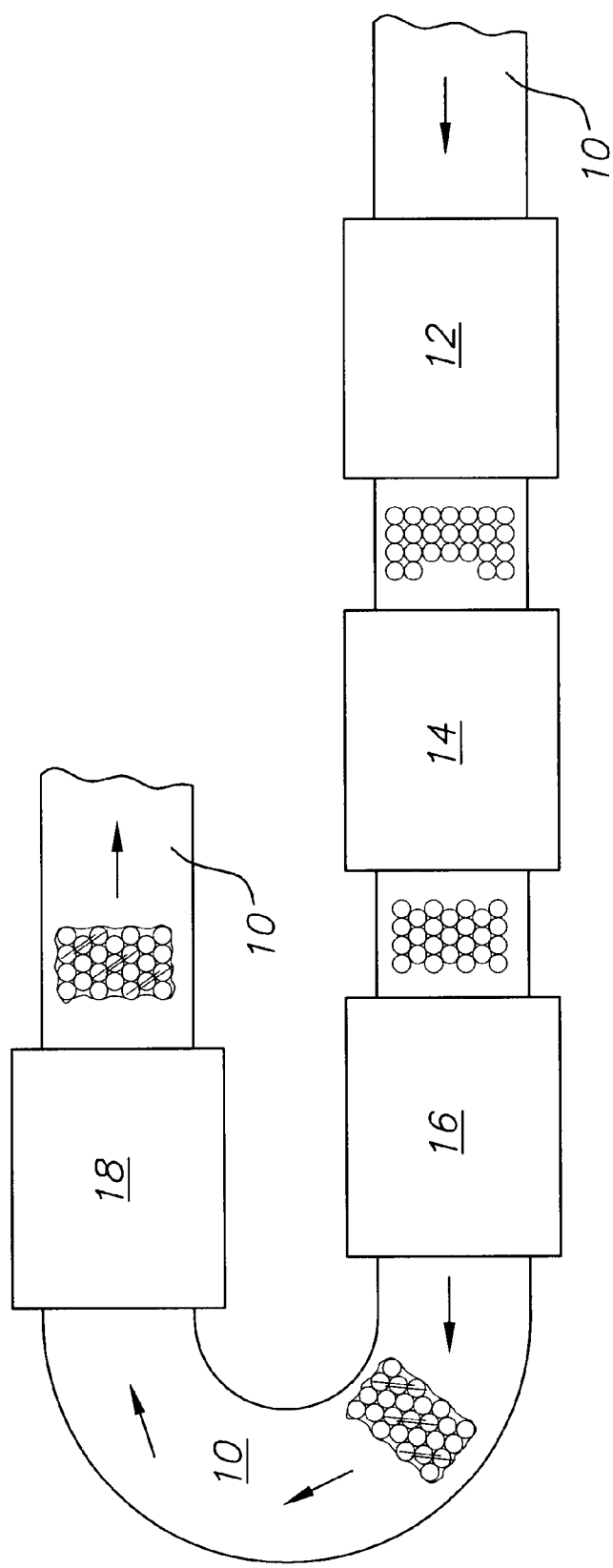
FIG. 3 is a fragmentary plan view of a packaging machine illustrating a conveyor system passing through various stations.

FIG. 3 shows a packaging machine for packaging the cans into twenty five pack close packed trayless arrays. Because the packs are trayless, the machine has no tray forming station. This saves overall processing time, reduces the overall length of the conveyor systems and obviates the need for additional raw materials such as the cardboard tray blanks and the adhesive. Also, the overall servicing time of the machine is reduced. All this assists at increasing the overall throughput rate of the machine.

The machine has a conveyor belt path 10 formed by various endless conveyors which pass successively through a marshalling station 12, a collating station 14, a wrapping station 16 and a sealing and heat shrinking station 18.

Figure 4:
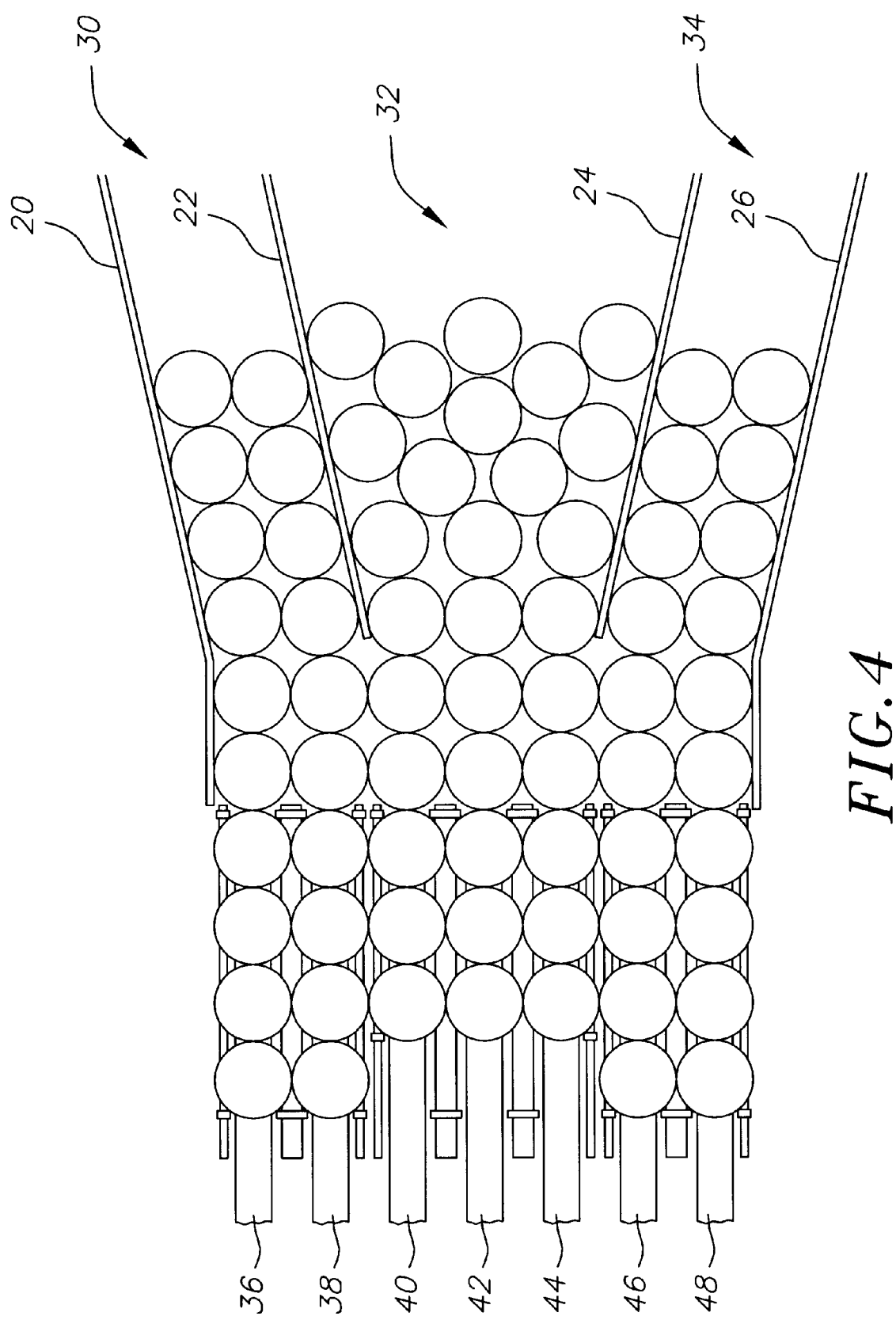
FIG. 4 is a plan view of a marshalling station of FIG. 3 with the protective cover removed.

The marshalling station 12 is shown more clearly in FIG. 4. In the manufacture of beverage cans, the empty cans are filled with the beverage and lids sealed onto the cans. The cans are tested and then fed along a conveyor belt system towards a reservoir area of the marshalling station. As they reach the marshalling station, the cans are divided by guide rails 20, 22, 24 and 26 to pass along three separate channels 30, 32 and 34. The cans taking the outer two channels 30 and 34 are confined to travelling two abreast while the cans along the central channel are funnelled to reach a point at which they are travelling three abreast. This separation into channels is beneficial because the cans in the outer two channels will be moving faster than the cans in the central channel 32.

As the cans exit from the channels, they emerge seven abreast and are transferred to seven spaced conveyor belts 36 to 48, one belt for each row of cans. Located between the belts 36 to 48 and running at a slower pace than the belts are an array of arresting fingers which slow down the speed of the cans along the conveyor system. This slow down in speed of the cans along the belts is cumulative and allows cans further upstream to catch up with the general mass of cans entering the reservoir area of the marshalling station. Once the cans have caught up, their progression is slowed down and there will be some slippage between the can and the belt that carries it.

The array of arresting fingers act to slow down the three rows of cans from the central channel by twenty five percent with respect to the speed of two rows of cans in each of the two outer channels during the period that the cans are retained by the fingers. Once the fingers have released the cans, the whole array of cans is accelerated away from the fingers by the belts 36 to 48 which are running at a faster rate than the fingers. The net result is that the process produces an array of cans spaced from the next array and in which the outer two rows of cans contain four cans each and three middle rows contain three cans each.

Figure 5:
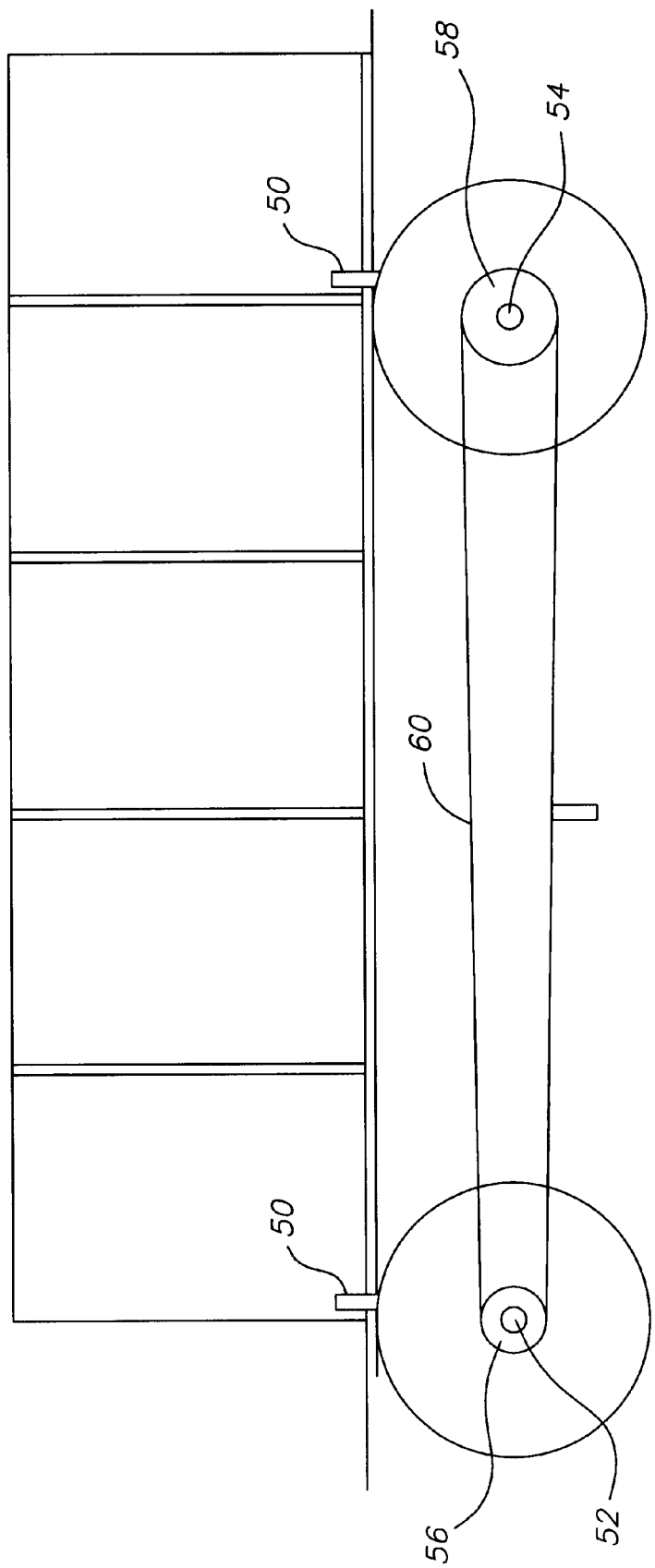
FIG. 5 is a fragmentary scale elevation of the marshalling station of FIG. 4.
Figure 6:
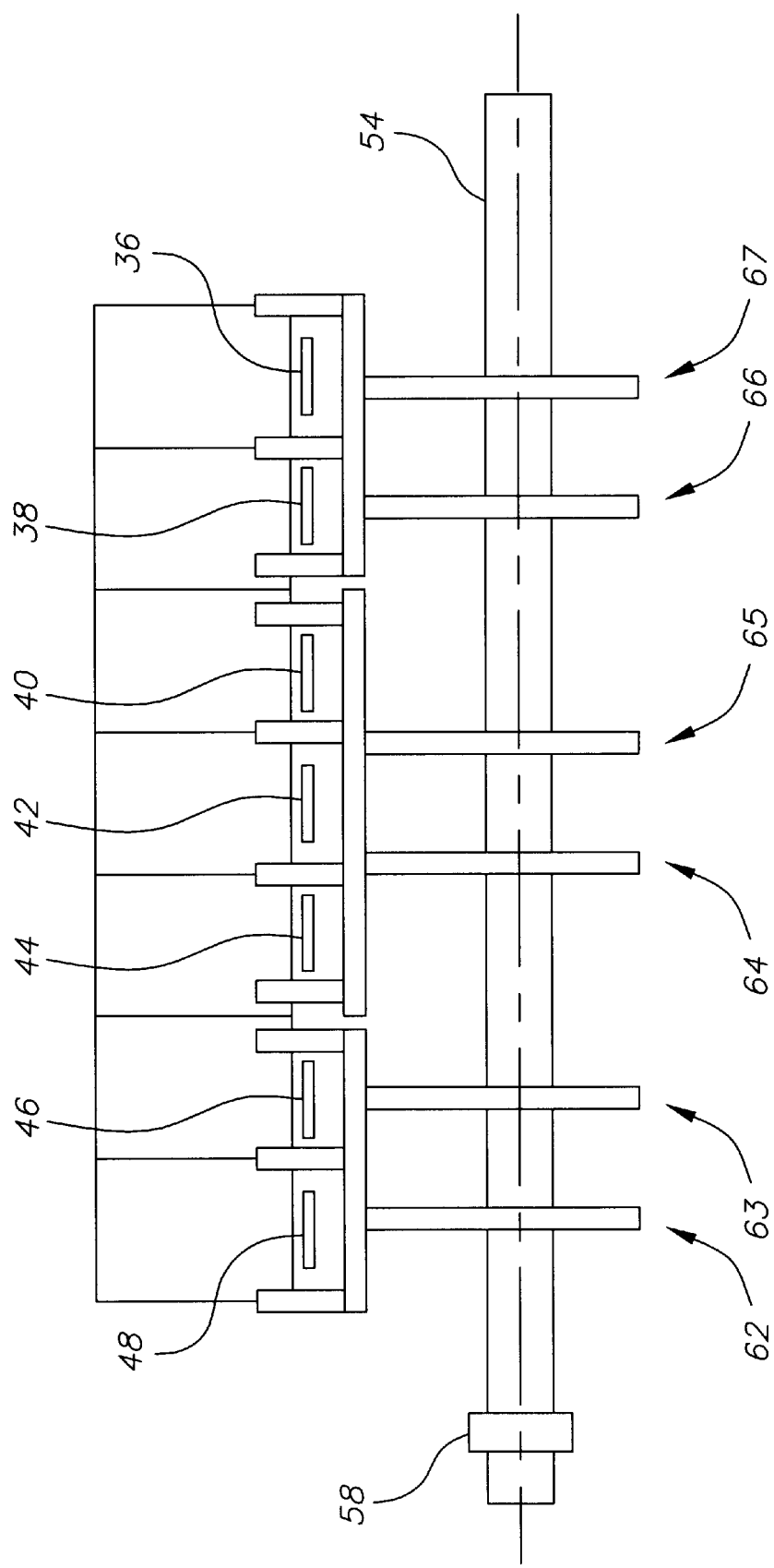
FIG. 6 is a rear view of the marshalling station of FIG. 4.

The arresting fingers 50 are supported on a series of endless chains which are supported by pairs of spaced sprocket wheels mounted on two spaced rotating shafts 52 and 54 (see FIG. 5).

The upstream shaft 52 is driven by an electric motor (not shown). A pulley 56 rigid with the shaft 52 is coupled to a larger pulley 58 rigid with the down stream shaft 54 by endless chain or drive belt 60.

The ratio of the diameters of the pulleys 56 and 58 is such that the downstream shaft 54 is driven by the upstream shaft at a speed twenty five percent lower.

The downstream shaft 54 carries six sprocket wheels 62 to 67. The sprocket wheels 64 and 65 are rigid with the shaft 54 and so are driven by the shaft 54. The sprocket wheels 62, 63, 66, and 67 are freely rotatable on the shaft. The chains supported by the sprocket wheels 62, 63, 66, and 67 are driven at the upstream end by corresponding sprocket wheels which are rigid with the shaft 56. In a similar manner, the chains supported by the sprocket wheels 64 and 65 are supported by corresponding sprocket wheels at the downstream end and these wheels are freely rotatable about the shaft 52.

Each drive chain carries a plurality of spaced fingers 50 with the fingers 50 on the driven chains carried by the sprocket wheels 62, 63, 66, and 67 being spaced a distance of four can diameters apart and the fingers of the drive chains carried by the sprocket wheels 64 and 65 being spaced a distance of three can diameters apart.

The drive chains are so arranged that an arresting finger 50 on each chain rises simultaneously between the seven rows of cans at the upstream end. The leading can in each row engages two arresting fingers 50 which are spaced apart slightly less than the diameter of a can and so helps to align the can on its corresponding belt. Where two adjacent arresting fingers 50 lying between a pair of adjacent belts are arranged to move at the same speed, they can be carried by the same drive chain. This occurs with the drive chains carried by the sprocket wheels 64, 70, 72 and 78.

In operation, as the aligned arresting fingers 50 leave the upstream end, they allow the cans on the conveyors 36, 38 and 46, 48 to be driven twenty five percent faster than the cans on the conveyors 40, 42 and 44. As a consequence, when the fingers 50 disengage the cans at the downstream end and the array is accelerated away from the downstream end of the marshalling station by the conveyors 36 to 48, it will consist of an array of seven rows having four cans in the first, second, sixth and seventh rows and three cans in the third, fourth and fifth rows.

The arresting pins which are carried by the chains may be pivotally secured to the chains and a cam arrangement provided to cause them to become rapidly upstanding as they approach the upstream end of the upper rum of the chain and to fall down rapidly as they approach the downstream end of the upper rum. This ensures quick and positive engagement with and then quick and positive release from, the cans.

Figure 7:
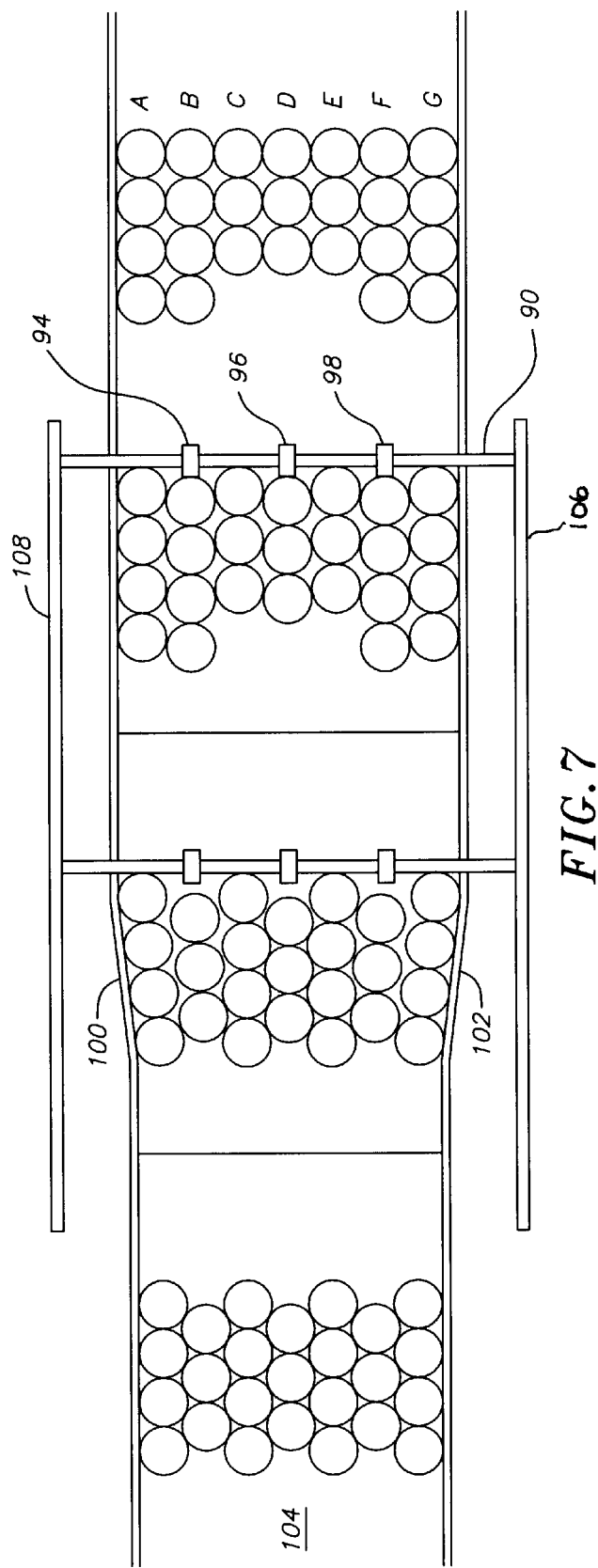
FIG. 7 is a plan view of a collating station of FIG. 3 with the protective cover removed.

The array of cans upon leaving the marshalling station now approaches the collating station (see FIG. 7) in an array of seven rows reference respectively A, B, C, D, E, F and G.

Figure 8:
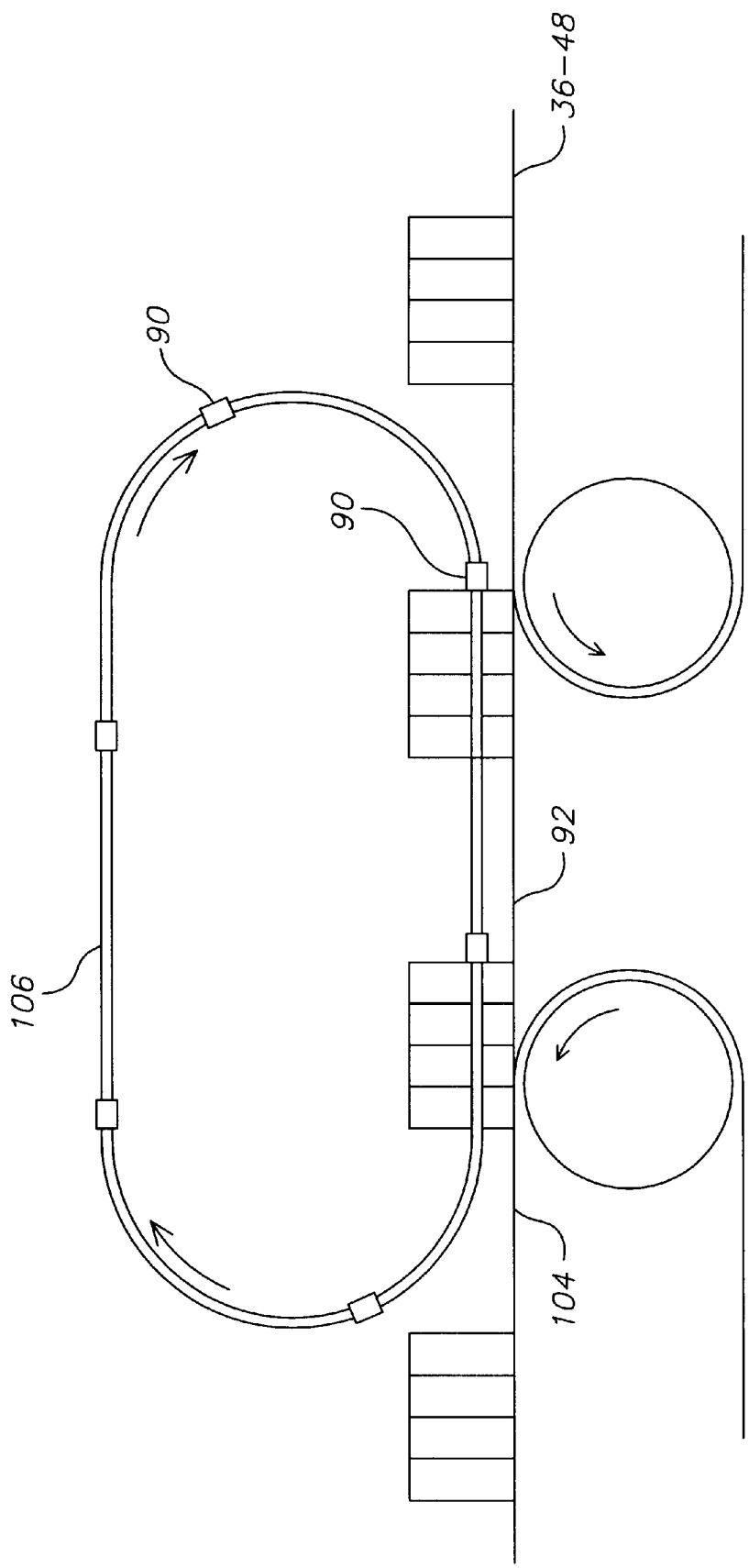
FIG. 8 is a side elevation of the collating station of FIG. 7.

At the collating station, a bar 90 (see FIG. 8) engages the trailing end of the array of cans and drives them forward off the end of the conveyor belts 36 to 48 onto a stationary deadplate 92. The surface of the deadplate 92 is a low friction surface and so the cans can readily slide across. The bar 90 has three projections 94, 96 and 98 which are positioned to respectively engage every alternate row of cans ie rows B, D and F so as to push the cans into that row forward relative to the four remaining rows A, C, E and G by a distance of between ¼ and ½ the diameter of the can.

In this displaced state, the cans are forced between a pair of converging guide plates 100 and 102. As the leading cans in rows A and G are forced to move inwardly by the guide plates 100 and 102, they displace the leading cans in rows B and F respectively in rows C and E and then move the whole array into a close packed formation. At this point, the bar 90 moves the close packed array onto a downstream conveyor belt 104 and returns via a loop to a point upstream of the deadplate. The close packed array is then carried by the belt 104 through the wrapping station 16 and then onto the sealing and heat shrinking station.

The bar 90 is one of several carried by a pair of endless chains 106 and 108 supported on a pair of spaced rotary drives (not shown).

The speed of the drive chains 106 and 108 is slightly higher than the speed of the belts 36 to 48 and the spacing between successive bars just slightly exceeds the spacing between successive arrays of cans as they emerge from the marshalling station.

What is claimed is:

1. A marshalling station for marshalling cylindrical objects arriving at the station into spaced arrays having different numbers of objects in different rows, the station comprising a reservoir for temporarily storing said objects as they arrive, a plurality of parallel conveyor belts, each belt being arranged to receive one row of said objects from said reservoir, a pair of arresting means located on opposite sides of each belt to be engaged by a leading object of each row, each arresting means being movable in the same direction as its corresponding belt but at a slower speed than the corresponding belt, different arresting means associated with different belts moving at different speeds so that during the period that said arresting means are operational, the objects on different belts move at different speeds, whereby when the arresting means disengage said objects, the plurality of belts accelerate away from said marshalling station, forming an array of objects in which different rows contain different numbers of objects.

2. A marshalling station according to claim 1, further comprising a plurality of endless drives supporting said different arresting means; a first corresponding plurality of wheels mounted on a first rotary shaft and supporting one end of each drive; a second plurality of wheels mounted on a secondary rotary shaft and supporting the opposite end of each drive, wherein selected wheels on the first shaft being rigid with the first shaft so as to drive the corresponding endless drives at a first speed, wherein the wheels on the second shaft not corresponding to the selected wheels on the first shaft being rigid with the second shaft so as to drive the corresponding endless drives at a second speed; and means for driving said shafts at different speeds.

3. A marshalling station according to claim 2, including belt and pulley means coupling said first and second shafts to be driven at different speeds to a common drive motor.

4. A marshalling station according to claim 2 or claim 3, wherein each arresting means comprises an arresting pin pivotally secured to a corresponding endless drive, and cam means operable to move the pin into a vertical position as it approaches an upstream end of an upper run of the drive and to cause the pin to move down from the vertical position as it approaches a downstream end of the drive.

5. A marshalling station according to claims 1, 2 or 3 wherein a first arresting means is moved at a speed twenty five percent slower than a second arresting means.

6. A marshalling station according to claims 1, 2 or 3 wherein the reservoir includes guide means for separating the objects approaching slower-moving rows of objects on selected belts, from faster moving rows of objects on other belts.

7. A packaging machine comprising a conveyor system for carrying objects along a path containing a marshalling station according to claim 6, a collating station, a wrapping station in which the array of objects are wrapped in a plastics sleeve and a sealing and heat shrinking station in which the sleeve is shrink-wrapped onto the array.

8. A marshalling station according to claim 6 wherein the reservoir includes guide means for separating the objects approaching slower-moving rows of objects on selected belts, from faster moving rows of objects on other belts.

9. A collating station for collating an array of twenty five objects arranged in a first formation into a second formation, comprising; first conveying means for conveying the objects arranged, row wise, in the first formation in which the objects are arranged in seven rows, the middle three rows having three objects each and the remaining rows having four objects each; pusher means for engaging a trailing column of objects of the array to displace the array in the same direction as the objects are being moved by the first conveyor means across a stationary surface and onto second conveyor means and then disengaging the array, the pusher means having projection which provide additional displacement of alternate rows of the array by an amount not exceeding the radius of the object; and guide means having converging surfaces to compress the array as it is being driven across the stationary surface into a close packed array in which each alternate row has four objects and each intervening row has three objects, thereby defining said second formation.

10. A collating station according to claim 9, wherein said pusher means comprises a pair of parallel spaced endless drive loops which are bridged by a succession of drive bars at spaced intervals around the loops, a lower run of the loop being at the level of the objects on the conveying means and the upper run of the loop being spaced above said objects.

* * * * *